US008874434B2

(12) United States Patent
Collobert et al.

(10) Patent No.: US 8,874,434 B2
(45) Date of Patent: Oct. 28, 2014

(54) METHOD AND APPARATUS FOR FULL NATURAL LANGUAGE PARSING

(75) Inventors: Ronan Collobert, Martigny (CH); Bing Bai, Princeton Junction, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 814 days.

(21) Appl. No.: 13/150,898

(22) Filed: Jun. 1, 2011

(65) Prior Publication Data

US 2011/0301942 A1    Dec. 8, 2011

Related U.S. Application Data

(60) Provisional application No. 61/350,580, filed on Jun. 2, 2010.

(51) Int. Cl.
*G06F 17/20* (2006.01)
*G06F 17/27* (2006.01)
*G06G 7/00* (2006.01)

(52) U.S. Cl.
CPC .......... *G06F 17/271* (2013.01); *G06F 17/2775* (2013.01)
USPC .............. 704/9; 704/1; 704/2; 704/4; 706/15; 706/26

(58) Field of Classification Search
CPC ..... G06F 17/20; G06F 17/27; G06F 17/2705; G06F 17/271; G06F 17/2715; G06F 17/272; G06F 17/2725; G06F 17/2755; G06F 17/2785; G10L 15/00; G10L 15/18; G10L 15/1822
USPC ............... 704/1, 9, 2, 4; 706/15, 26
See application file for complete search history.

(56) References Cited

U.S. PATENT DOCUMENTS

| | | | | |
|---|---|---|---|---|
| 5,475,588 A * | 12/1995 | Schabes et al. | | 704/9 |
| 6,108,620 A * | 8/2000 | Richardson et al. | | 704/9 |
| 6,631,346 B1 * | 10/2003 | Karaorman et al. | | 704/9 |
| 6,859,771 B2 * | 2/2005 | Huang et al. | | 704/1 |
| 6,952,666 B1 * | 10/2005 | Weise | | 704/9 |
| 7,013,262 B2 * | 3/2006 | Tokuda et al. | | 704/9 |
| 7,302,384 B2 * | 11/2007 | Moore | | 704/9 |
| 7,464,024 B2 * | 12/2008 | Luo et al. | | 704/9 |
| 7,603,651 B2 * | 10/2009 | De Brabander | | 717/105 |
| 7,610,191 B2 * | 10/2009 | Gao et al. | | 704/9 |
| 8,180,633 B2 * | 5/2012 | Collobert et al. | | 704/232 |
| 2006/0277028 A1 * | 12/2006 | Chen et al. | | 704/4 |
| 2007/0016398 A1 * | 1/2007 | Buchholz | | 704/4 |
| 2009/0030686 A1 * | 1/2009 | Weng et al. | | 704/240 |

OTHER PUBLICATIONS

Nobuyuki Shimizu and Andrew Haas. 2006. Exact decoding for jointly labeling and chunking sequences. In Proceedings of the COLING/ACL on Main conference poster sessions (COLING-ACL '06). Association for Computational Linguistics, Stroudsburg, PA, USA, 763-770.*

(Continued)

*Primary Examiner* — Paras D Shah
(74) *Attorney, Agent, or Firm* — Joseph Kolodka (57) ABSTRACT

The method and apparatus for discriminative natural language parsing, uses a deep convolutional neural network adapted for text and a structured tag inference in a graph. In the method and apparatus, a trained recursive convolutional graph transformer network, formed by the deep convolutional neural network and the graph, predicts "levels" of a parse tree based on predictions of previous levels.

21 Claims, 6 Drawing Sheets

(56) References Cited

OTHER PUBLICATIONS

Ronan Collobert and Jason Weston. 2008. A unified architecture for natural language processing: deep neural networks with multitask learning. In Proceedings of the 25th international conference on Machine learning (ICML '08). ACM, New York, NY, USA, 160-167.*

Yoshimasa Tsuruoka, Jun'ichi Tsujii, and Sophia Ananiadou. 2009. Fast full parsing by linear-chain conditional random fields. In Proceedings of the 12th Conference of the European Chapter of the Association for Computational Linguistics (EACL '09). Association for Computational Linguistics, Stroudsburg, PA, USA, 790-798.*

Thollard, Franck, and Alexander Clark. "Shallow parsing using probabilistic grammatical inference." Grammatical Inference: Algorithms and Applications. Springer Berlin Heidelberg, 2002. 269-282.*

* cited by examiner

| Level 3 | B-S | I-S | I-S | E-S | 304 |
| Level 2 | O | O | B-VP | E-VP | 303 |
| Level 1 | O | O | O | S-S#VP | 302 |
| *Words* | But | stocks | kept | falling | 301 |

METHOD AND APPARATUS FOR FULL NATURAL LANGUAGE PARSING

RELATED APPLICATIONS

This application claims the benefit of U.S. Provisional Application No. 61/350,580, filed Jun. 2, 2010, the entire disclosure of which is incorporated herein by reference.

FIELD

The present disclosure relates to Natural Language Processing. More specifically, the present disclosure relates to a method and an apparatus for full natural language parsing.

BACKGROUND

Parsing has been pursued with tremendous efforts in the Natural Language Processing (NLP) community. Since the introduction of lexicalized probabilistic context-free grammar (PCFGs) parsers, improvements have been achieved over the years, but generative PCFGs parsers of the last decade still remain standard benchmarks. Given the success of discriminative learning algorithms for classical NLP tasks (Part-Of-Speech (POS) tagging, Name Entity Recognition, Chunking . . . ), the generative nature of such parsers has been questioned. First, discriminative parsing algorithms have not reached the performance of standard PCFG-based generative parsers. The parser reported in DISCRIMINATIVE TRAINING OF A NEURAL NETWORK STATISTICAL PARSER, by J. Henderson outperforms the parser reported in HEAD-DRIVEN STATISTICAL MODELS FOR NATURAL LANGUAGE PARSING, by M. Collins, only by using a generative model and performing re-ranking. The pure discriminative parsers reported in MAX-MARGIN PARSING, by B. Taskar et al. and ADVANCES IN DISCRIMINATIVE PARSING by J. Turian et al. finally reached Collins' parser performance, with various simple template features. However, these parsers are slow to train and are limited to sentences with less than 15 words. Most recent discriminative parsers are based on Conditional Random Fields (CRFs) with PCFG-like features.

Accordingly, there is a need for a fast discriminative parser which does not rely on information extracted from PCFG's or on most classical parsing features.

SUMMARY

A method is disclosed herein for generating a linguistic parse tree for a sentence. The method comprises the steps of: predicting in a computer process a first level of chunk tags for the sentence; and predicting in a computer process at least a second level of chunk tags for the sentence using the first level or a previous level of chunk tags.

Also disclosed is an apparatus for generating a linguistic parse tree for a sentence. The apparatus comprises a processor executing instructions for predicting a first level of chunk tags for the sentence, and predicting at least a second level of chunk tags for the sentence using the first level or a previous level of chunk tags.

Further disclosed is an apparatus for generating a linguistic parse tree for a sentence. The apparatus comprises a Graph Transformer Network (GTN) for predicting a first level of chunk tags for the sentence, and predicting at least a second level of chunk tags for the sentence using the first level or a previous level of chunk tags.

DETAILED DESCRIPTION

Figure 2A:
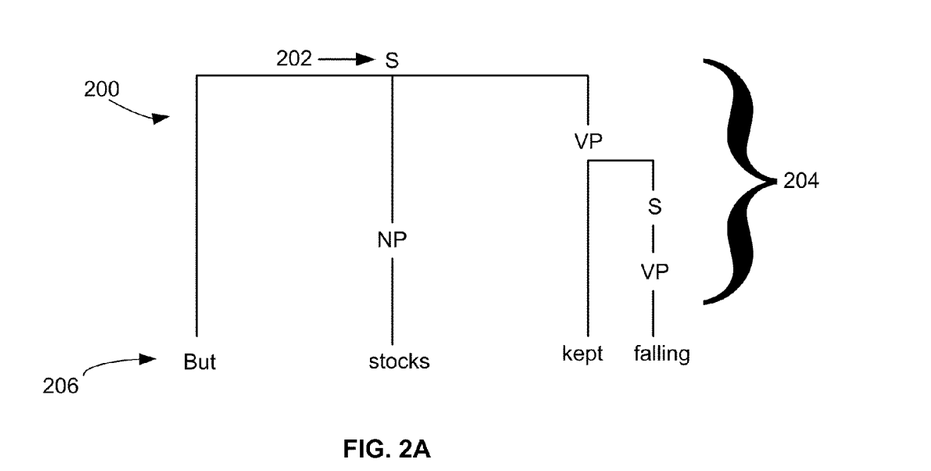
FIG. 2A illustrates an exemplary embodiment of a linguistic parse tree generated for an exemplary sentence in a natural language.

FIG. 2A illustrates an exemplary embodiment of a linguistic parse tree 200 for the sentence "But stocks kept falling." The root 202 of the parse tree spans the entire sentence and is recursively decomposed into sub-constituents 204 (the nodes of the tree). The sentence and sub-constituents are identified with labels comprising without limitation NP (noun phrase), VP (verb phrase), and S (sentence). The leaves 206 of the parse tree comprise the words of the sentence.

Many Natural Language Processing (NLP) tasks involve finding chunks of words in a sentence, which can be viewed as a tagging task. For instance, "chunking" is a task related to parsing, a label is obtained for the lowest parse tree node where a word ends up. For the parse tree shown in FIG. 2A, chunk tags can be written as:

| But | stocks | kept | falling |
|-----|--------|------|---------|
| O   | S-NP   | B-VP | E-VP,   | using an IOBES (inside, other, beginning, end, and single) tagging scheme to label chunk boundaries, i.e., identify the location of the current word in the chunk. The "S-NP" chunk tag is used to label the noun phrase containing the single word "stocks," the "B-VP" chunk tag is used to label the first word "kept" of the verb phrase "kept falling," and the "E-VP" chunk tag is used to label the last word "falling" of the verb phrase "kept falling." The IOBES tagging scheme also includes other chunk tags comprising, without limitation, the "B-NP" chunk tag for labeling the first word of a noun phrase, the "I-NP" chunk tag is for labeling the intermediate word of a noun phrase, and the "E-NP" chunk tag for labeling the last word of a noun phrase. The "O" chunk tag is for labeling words that are not members of a chunk.

Instead of building the linguistic parse tree in a conventional top-down fashion (building from the root), the discriminative parsing method and apparatus of the present disclosure views a parse tree as levels of chunk tags and thus, generates each level of the parse tree from the bottom up, i.e., the number of chunk tags become less at each level moving from the leaves to the root, with the chunk tags spanning longer segments of the sentence. Each level of the parse tree will have tags that spans several consecutive tags in the previous level. Eventually a level is reached that has only one tag that covers the entire sentence. A full parse tree is realized by connecting each chunk tag to the chunks tags in the previous level.

Figure 1:
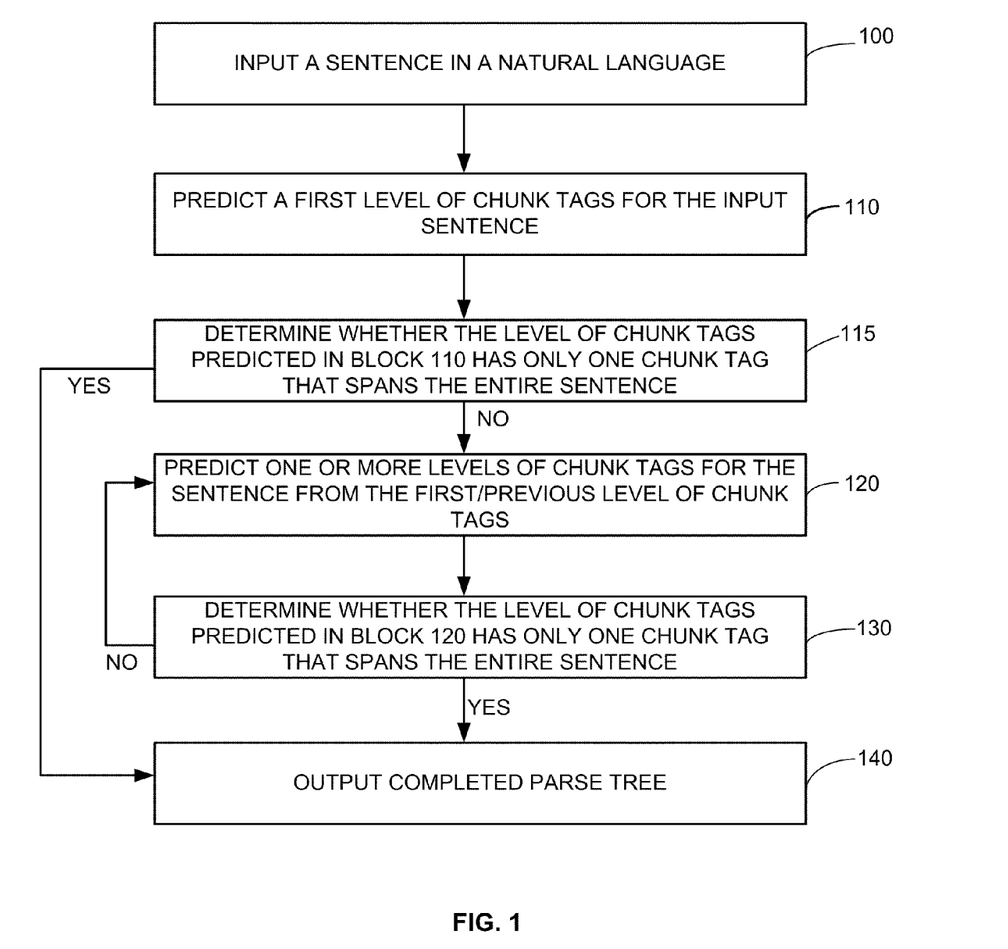
FIG. 1 is a flowchart of an exemplary embodiment of a discriminative parsing method of the present disclosure.

FIG. 1 is a flowchart of an exemplary embodiment of the discriminative parsing method (tagging method) of the present disclosure. The tagging method commences in block 100, with an input sentence in a natural language which is applied to block 110.

In block 110, a first level of chunk tags is predicted for the sentence. The first level of chunk tags is predicted using features including, without limitation, a lookup table of the words and the part-of-speech of the words.

In block 115, a determination is made as to whether the level of chunk tags predicted in block 110 has only one chunk tag that spans the entire sentence. If the level predicted in block 110 has only one chunk tag that spans the entire sentence, then a completed parse tree outputted in block 140 and the method ends. If not, the method moves to block 120.

In block 120, one or more levels of chunk tags is/are predicted for the sentence from the first/previous level of chunk tags. The first/previous level of chunk tags are used as features and constraints to predict the chunk tags of the current level.

In block 130, a determination is made as to whether the level of chunk tags predicted in block 120 has only one chunk tag that spans the entire sentence. If the level predicted in block 120 has only one chunk tag that spans the entire sentence, then a completed parse tree outputted in block 140 and the method ends. If, however, the level predicted in block 120 has more than one chunk tag, then the method returns to block 120 where another level of chunk tags is predicted from the previous level of chunk tags and this level is evaluated in block 130 to determine whether this level has only one chunk tag that spans the entire sentence. Blocks 120 and 130 are performed until a level is reached that has only one tag that covers the entire sentence.

Figure 2B:
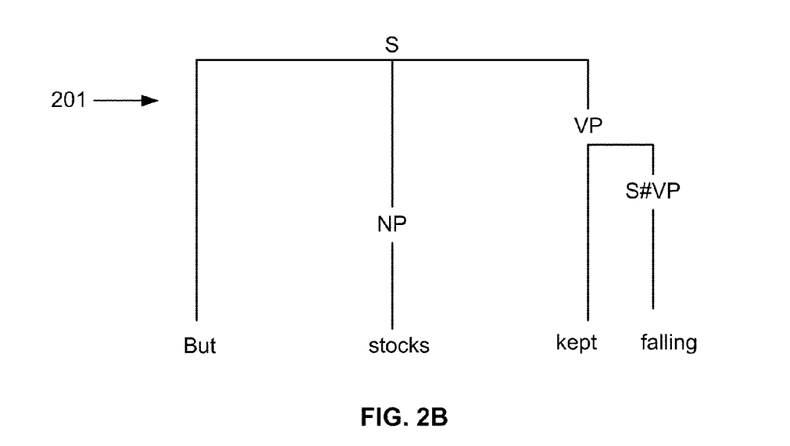
FIG. 2B illustrates the parse tree of FIG. 2A with consecutive tree levels merged when they cover the same segment of the sentence.
Figure 2C:
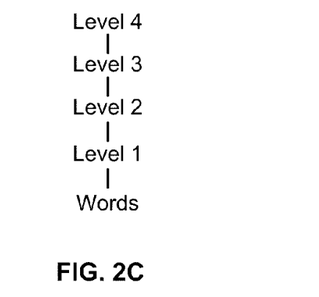
FIG. 2C illustrates levels of the tree of FIG. 2B.
Figure 3:
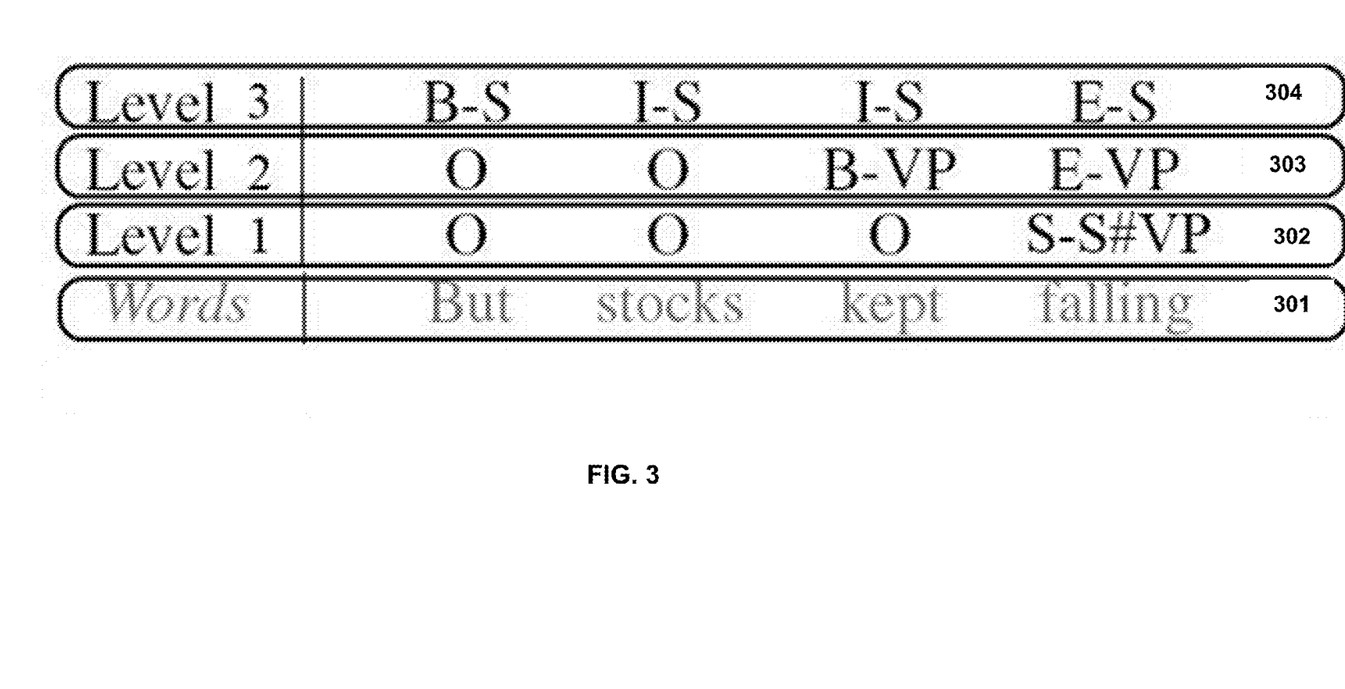
FIG. 3 illustrates three levels of labeling tasks for predicting the parse tree of FIG. 2B.

FIG. 3 illustrates a stack 300 comprising sentence 301 and tag levels 302-304 (Level 1, Level 2, and Level 3) which is used to predict the linguistic parse tree illustrated in FIG. 2B. The parse tree illustrated in FIG. 2B is similar to the parse tree 200 illustrated in FIG. 2A, however, method of FIG. 1 is constrained by the rule that consecutive tree levels are to be merged when they cover the same segment of the sentence. In accordance with the method of the disclosure, the lowest nodes of the parse tree of FIG. 2B correspond to the Level 1 chunk tags. Tree nodes which contain sub-nodes are ignored at this stage, e.g., FIG. 2B, the word "kept" is not labeled with the "S-VP" tag in Level 1, as the node "VP" still contains sub-nodes "S" and "VP" above the word "falling." Words not in one of the lowest nodes are labeled with the "O" tag. The lowest nodes of the tree are then stripped, and the same process used to generate the Level 1 tags is used to generate the Level 2 chunk tags. This process is repeated until one of the Levels contains the root node. This bottom-up process is used because it can be relied upon for lower level predictions, i.e., the chunking task, which describes the lowest parse tree nodes in another manner, has a very good performance.

The method of FIG. 1 is performed by a tagging apparatus (tagger) which predicts each "level" of the parse tree based on predictions of previous levels. The same tagger is used for predicting all parse tree levels. The tagger used for predicting the levels can comprise a trained recursive convolutional graph transformer network.

The tagging process fits naturally into the recursive definition of the parse tree levels. However, the predicted tags must correspond to a parse tree as described earlier above with respect to parse tree of FIG. 2B and block 110 of FIG. 1. In a parse tree, a parent node includes child nodes. Without constraints during the parse tree level predictions, one could face a chunk partially spanning another chunk at a lower level, which would violate the parse tree constraint that the parent included child nodes. To insure that the tagging process corresponds to a valid tree, a "valid tree" constraint can be added which forces higher level chunks to fully include lower level chunks. It possible, however, that this iterative process may never end, because it can be subject to loops. For example, the valid tree constraint can still be satisfied if the tagger predicts the same tags for two consecutive levels. This problem is solved by: (a) modifying the training parse trees such that nodes grow strictly as we go up in the parse tree and (b) enforcing the corresponding valid tree and other constraints in the tagging process.

Accordingly, tree nodes spanning the same words for several consecutive level are first replaced by one node in the whole training set. The label of this new node is the concatenation of replaced node labels as illustrated in FIG. 2B. At test time, the inverse operation is performed on nodes having concatenated labels. Considering all possible label combinations would be intractable. Note that more than two labels might be concatenated, e.g., the tag SBAR#S#VP is quite common in the training set. With this additional pre-processing, any tree node is strictly larger (in terms of words it spans) than each of its children. The following constraint (Constraint 1) is then enforced during the iterative tagging process:

Constraint 1: Any chunk at level a overlapping a chunk at level $j<i$ must span at least this over-lapped chunk, and be larger.

As a result, the iterative tagging process described above will generate a chunk of size N in at most N levels, given a sentence of N words. At this time, the iterative loop is stopped, and the full tree can be deduced. The process might also be stopped if no new chunks are found (all tags are O). Assuming the tree pre-processing has been performed, this method can be used with any tagger that could handle a history of labels and tagging constraints. Even though the tagging process is greedy because there is no global inference of the tree, it performs surprisingly well.

Figure 4:
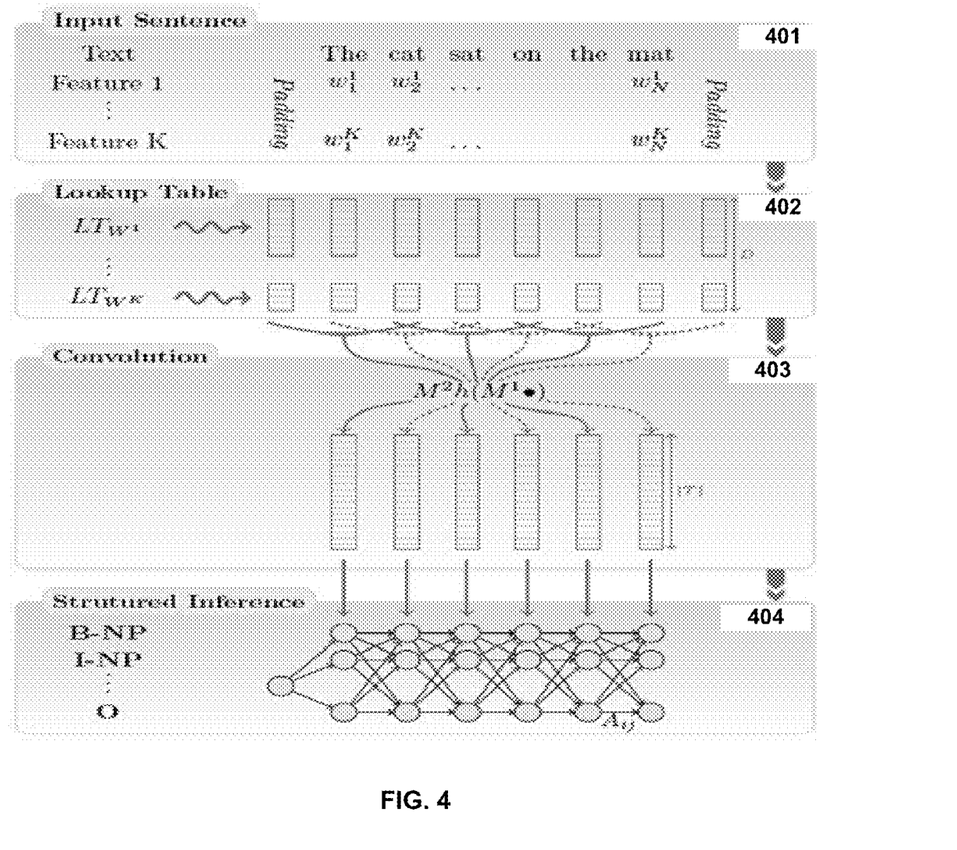
FIG. 4 illustrates an exemplary embodiment of a tagger comprising a trained recursive convolutional graph transformer network.

FIG. 4 illustrates an exemplary embodiment of the tagger for performing the method of the present disclosure. This tagger comprises a trained recursive convolutional graph transformer network (GTN) 400 which is formed by a deep temporal convolutional neural network (CNN) module 403 adapted for text and a structured tag inference in a graph module 404. The GTN 400 predicts a "level" of the tree based on predictions of previous levels by outputting a graph over which inference is achieved with a Viterbi algorithm. In the input module 401, given a sequence of words, a set of discrete features are presented for each word. Such features can include, without limitation, a word ID, upper case (the first letter of the word or the entire word) or lower case, etc. For parsing tasks, also included are parts of speech (POS) and the parse tree tags of the previous level (FIG. 3).

A look-up table module 402 comprises a plurality of look-up tables which assign a "latent-feature" vector for each feature. The values in these vectors have latent semantic meanings to aid the parsing process. The vectors are concatenated into one feature vector per word, and are inputted to the CNN module 403.

The CNN module 403 is applied on every window of words (given a fixed window size) and outputs probabilities (scores) for each tag for the word in the middle of the window. A CNN module 403 multiplies a filter matrix M to a sliding window of words. If, for example but not limitation, the window size is set to 3, then for each word, the lookup table entries (vectors) of the word before it, the word itself, and the word after it, are concatenated to a single vector. Then the filter matrix M is applied to the concatenated vector.

Note that the "padding" features are added to the beginning and the end of the sentence to cause the first several words and the last several words to be in the center of their window.

Padding refers to the process of placing a "fake" word before the sentence and after the sentence to ensure every word to be tagged in the sentence is generally in the middle of the window when the CNN module 403 is applied. For example but not limitation, if the lookup table module 402 has a window size of 3, therefore, three consecutive words are to be concatenated and the word to be tagged is in the middle of this window. So for the first word to be tagged, we have to insert a fake word before it, so the first word can be in the middle when that 3-window is applied. The same process is performed for the last word of the sentence. The faked words have their own lookup tables. In another example, if the window size is 5, then two padding words are added at the beginning and at the end. In general, the number of padding words is (n−1)/2, given n is the size of the sliding window and n is a odd number.

The graph module 404 enforces the dependency of the parsing tags of neighboring words using Viterbi algorithms. The graph module 404 calculates the likelihood score of a possible label sequence by combining the scores of nodes provided by the CNN module 403 and additional transition scores for edges of a graph. The score for an edge is defined as follows: if an edge is between two nodes and we label the first node "NP", the second node "VP", the edge will have a higher score than if you label both of them "VP", because the edge is less likely to have two verb phrases in a row. All network and graph parameters are trained in a end-to-end way with a stochastic gradient maximizing a graph likelihood. The GTN based tagger 400 runs recursively to generate the parse tree level by level. For example, given the text in block 301, the three levels of parse trees 302, 303, and 304 are built by running the tagger 400 three time.

The following discussion describes in detail the method performed by the tagger 400.

Word Embeddings

Consider a fixed-sized word dictionary W, where unknown words are mapped to a special "UNKNOWN" word, and where numbers are mapped to a "NUMBER" word. Given a sentence of N words $\{w_1, w_2, \ldots, w_N\}$, each word $w_n \in W$ is first embedded into a D-dimensional vector space, by applying a lookup-table operation:

$$LT_W(w_n) = W \times \left(0, \ldots 0, \underset{\text{at index } w_n}{1}, 0, \ldots 0\right)^T = W_{w_n}, \quad (1)$$

where the matrix $W \in \mathbb{R}^{D \times |W|}$ represents the parameters to be trained in this lookup layer. Each column $W_n \in \mathbb{R}^D$ corresponds to the embedding of the $n^{th}$ word in the dictionary W. In view of the matrix-vector notation in equation (1), the lookup-table applied over the sentence can be seen as an efficient implementation of a convolution with a kernel width of size 1.

In practice, a word should be represented with more than one feature. In one embodiment, at least the lower case words and a "caps" feature:
$w_n = w_n^{lowcaps}, w_n^{caps}$) are taken. In this embodiment, a different lookup-table is applied for each discrete feature $LT_{W^{lowcaps}}$, $LT_{W^{caps}}$), and the word embedding becomes the concatenation of the output of all the lookup-tables:

$$LT_{W^{words}}(w_n) = (LT_{W^{lowcaps}}(w_n^{lowcaps})^T, LT_{W^{caps}}(w_n^{caps})^T. \quad (2)$$

For simplicity, the remainder of the description considers only one lookup-table.

Word Scoring

Scores for all tags T and all words in the sentence are produced by applying the convolutional neural network over the lookup-table embeddings of equation (1). More precisely, all successive windows of text (of size K) is considered, sliding over the sentence, from position 1 to N. At position n, the network is fed with the vector $x_n$ resulting from the concatenation of the embeddings:

$$x_n = (W_{w_{n-(K-1)/2}}^T, \ldots, W_{w_{n+(K-1)/2}}^T)^T.$$

The words with indices exceeding the sentence boundaries (n−(K−1)/2)<1 or (n+(K−1)/2)>N) are mapped to a special "PADDING" word. As with any neural network, the tagger of the present disclosure performs several matrix-vector operations on its inputs, interleaved with some non-linear transfer function h(·). The tagger outputs a vector of size |T| for each word at position n, interpreted as a score for each tag in T and each word $w_n$ in the sentence:

$$s(x_n) = M^2 h(M^1 x_n) \quad (3)$$

where the matrices $M^1 \in \mathbb{R}^{H \times (KD)}$ and $M^2 \in \mathbb{R}^{|T| \times H}$ are the trained parameters of the network. The number of hidden units H is a hyper-parameter to be tuned. In one embodiment, the transfer function can comprise a hyperbolic tangent h(z)= tan h(z).

Long-Range Dependencies

The "window" approach described above assumes that the tag of a word is solely determined by the surrounding words in the window. This process works on short sentences but falls short on long sentences. Therefore, in an alternate embodiment of the tagger (the sentence process), all words $\{w_1, w_2, \ldots, w_N\}$ are considered for tagging a given word $w_n$. To specify to the network that we want to tag the word an additional lookup-table is introduced in equation (2), which embeds the relative distance (m−n) of each word $w_m$ in the sentence with respect to $w_n$. At each position $1 \leq m \leq N$, the outputs of the all lookup-tables in equation (2) (low caps word, caps, relative distance, etc.) $LT_{W^{words}}(w_m)$ are first combined together by applying a mapping $M^0$. A fixed-size "global" feature vector $x_n$ is then extracted by performing a max over the sentence:

$$[x_n]_i = \max_{1 \leq m \leq N} [M^0 LT_W \text{words}(w_m)]_i \, \forall i \quad (4)$$

This feature vector is then fed to scoring layers in equation (3). The matrix $M^0$ is trained by back-propagation, as with any other network parameter.

Structured Tag Inference

Figure 5:
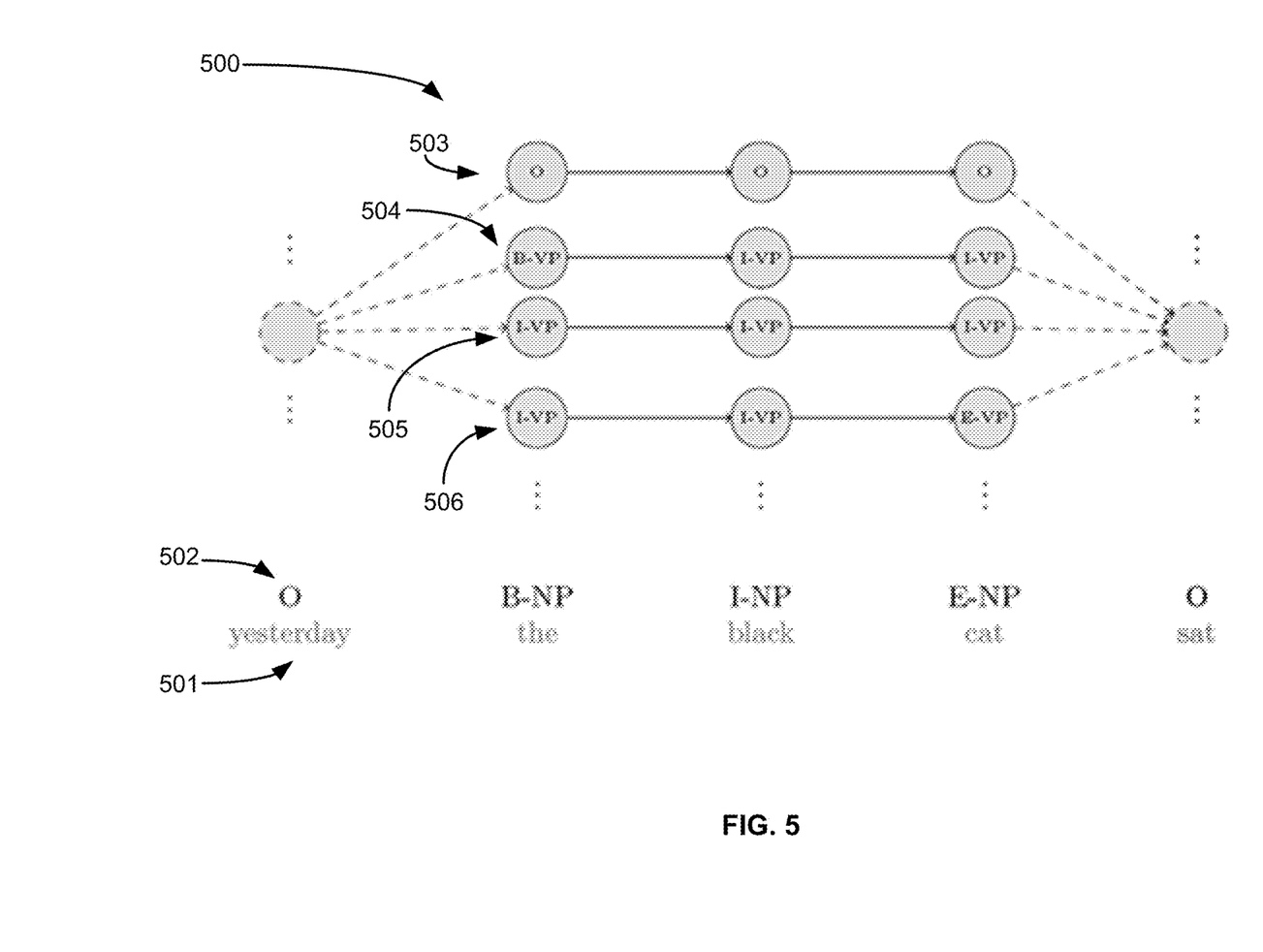
FIG. 5 illustrates an exemplary embodiment of a graph outputted by the tagger.

It is known that there are strong dependencies between parsing tags in a sentence: not only are tags organized in chunks, but some tags cannot follow other tags. It is, therefore, natural to infer tags from the scores in equation (3) using a structured output approach. Therefore, a transition score $A_{tu}$, is used for jumping from tags $t \in T$ to $u \in T$ in successive words, and an initial score $A_{t0}$ is used for starting from the $t^{th}$ tag. The last module of the GTN tagger outputs a graph with |T|×N nodes $G_{tn}$ (FIG. 5). Each node $G_{tn}$, is assigned a score $s(x_n)$ from the previous module (3) of the tagger. Given a pair of nodes $G_{tn}$ and $G_{um}$, an edge is added with the transition score $A_{tu}$ on the graph. For compactness, sequence notation $[t]_1^N \triangleq \{t_1, \ldots, t_n\}$ is used for now. A tag path $[t]_1^N$ is scored in the graph G, as the sum of scores along $[t]_1^N$ in G:

$$S([w]_1^N, [t]_1^N, \theta) = \sum_{n=1}^{N} (A_{t_{n-\Sigma}t_n} + s(x_n)_{t_n}), \quad (5)$$

where $\theta$ represents all the trainable parameters of the GTN tagger (W, $M^1$, $M^2$ and A). The sentence tags $[t^*]_1^N$ are then inferred by finding the path which leads to the maximal score:

$$[t^*]_1^N = \underset{[t]_1^N \in T^N}{\arg\max} \, S([w]_1^N, [t]_1^N, \theta). \quad (6)$$

The Viterbi algorithm can be used for this inference.

FIG. 5 illustrates a graph 500 outputted by the GTN tagger for the sentence 501 "yesterday the black cat sat," with the implementation of tree constraints. Each path 503, 504, 505, and 506 of the graph represents the possible tagging for a current level of chunk tags, based on the tagging of a previously predicted level of chunk tags (path 502 in this example). The method of the present disclosure determines which tagging in paths 503, 504, 505, 506 is the most likely tagging for the current level of chunk tags. The graph module 404 calculates scores for them and selects or predicts the most likely tagging, and passes that tagging to the next level to be predicted. The chunk history 502 contains the noun phrase NP or chunk: "the black cat." At the current level, the graph is constrained for the sections overlapping this chunk, such that new overlapping chunks include "the black cat," and are strictly larger. The top candidate path 503 is taken when no chunk is found (0). The three next candidate paths 504, 505, and 506 relate to the candidate label VP. The graph contains similar triplets of paths (not shown) for all the other labels.

All the parameters of the network $\theta$ are trained in an end-to-end manner as follows. Following the GTN tagger's training method, a probabilistic framework is considered, where a likelihood is maximized over all the sentences $[w]_1^N$ in a training set, with respect to network $\theta$. The score of equation (5) can be interpreted as a conditional probability over a path by taking it to the exponential (making it positive) and normalizing with respect to all possible paths (summing to 1 over all paths). Taking the log(·) leads to the following conditional log-probability:

$$\log p([t]_1^N | [w]_1^N, \theta) = S([w]_1^N, [t]_1^N, \theta) - \underset{\forall [u]_1^N \in T^N}{\text{logadd}} \, S([w]_1^N, [u]_1^N, \theta), \quad (7)$$

where the notation $\log \text{add}_i z^i = \log(\Sigma_i e^{x_i})$ is adopted. This likelihood is the same as the one found in Conditional Random Fields (CRFs) [17] over temporal sequences. The CRF model is however linear (which would correspond in our case to a linear neural network, with fixed word embeddings).

Computing the log-likelihood of equation (7) efficiently is not straightforward, as the number of terms in the log add grows exponentially with the length of the sentence. Fortunately, in the same spirit as the Viterbi algorithm, one can compute it in linear time with the following classical recursion over n:

$$\delta_n(v) \triangleq \underset{\{[u]_1^N \cap u_n = v\}}{\text{logadd}} \, S([w]_1^n, [u]_1^n, \theta) \quad (8)$$

$$= \underset{t}{\text{logadd}} \, \underset{\{[u]_1^n \cap u_{n-1} = t \cap u_n = v\}}{\text{logadd}} \, S([w]_1^{n-1}, [u]_1^{n-1}, \theta + A_{u_{n-1}v} + s(x_n)_v)$$

$$= s(x_n)_v + \underset{t}{\text{logadd}} \, (\delta_{n-1}(t) + A_{tv}) \, \forall_v \in T,$$

followed by the termination $\log \text{add}_{\forall [u]_1^N} \, S([w]_1^N), [u]_1^N$, $\theta = \log \text{add}_u \delta_N(u)$. As a comparison, the Viterbi algorithm used to perform the inference of equation (6) is achieved with the same recursion, but where the log add is replaced by a max, and then tracking back the optimal path through each max.

Stochastic Gradient

The log-likelihood of equation (7) can be maximized using stochastic gradient ascent, which has the main advantage to be extremely scalable. Random training sentences $[w]_1^N$ and their associated tag labeling $[t]_1^N$ are iteratively selected. The following gradient step can then performed:

$$\theta \leftarrow \theta + \lambda \partial \log p([t]_1^N | [w]_1^N, \theta) / \partial \theta, \quad (9)$$

where $\lambda$ is a chosen learning rate. The gradient in equation (9) is efficiently computed via back-propagation: the differentiation chain rule is applied to the recursion of equation (8), and then to all network layers of equation (3), including the word embedding layers of equation (1).

The GTN tagger of the present disclosure is made "recursive" by adding an additional feature (and its corresponding lookup-table of equation (1)) describing a history of previous tree levels. For that purpose, all chunks which were discovered in previous tree levels are gathered. If several chunks were overlapping at different levels, only the largest one is considered. Assuming that Constraint 1 is true, a word can be at most in one of the remaining chunks. This is the history $\mathcal{C}$ Another kind of history can be selected (e.g. a feature for each arbitrary chosen LEN previous levels), however, the proposed history for implementing Constraint 1 must be computed. The corresponding IOBES tags of each word are be fed as features to the GTN tagger. For instance, assuming the labeling in FIG. 3 was found up to Level 2, the chunks considered in history 9$\mathcal{C}$ for tagging Level 3 would be only the NP around "stocks" and the VP around "kept falling". The S and VP around "falling" would be discarded as they are included by the larger VP chunk.

Implementing Constraint 1 is now made easy using this history $\mathcal{C}$ and a IOBES tagging scheme. For each chunk $c \in C$, the graph outputted by the GTN is adapted such that any new candidate chunk $\tilde{c}$ overlapping chunk c includes chunk c, and is larger than chunk c. For each candidate label (e.g., VP), multiple possible paths (FIG. 5) are created for the duration of chunk c. In the first path, both chunk c and candidate chunk $\tilde{c}$ start at the same position. The first tag of candidate chunk $\tilde{c}$ is then B-VP, and remaining tags overlapping with chunk c are maintained at I-VP. In this way, candidate chunk $\tilde{c}$ has to end after chunk c. In the second path, both chunk c and candidate chunk $\tilde{c}$ end at the same position. The last tag of candidate chunk $\tilde{c}$ is then E-VP, and previous tags overlapping with chunk c are maintained at I-VP. In this way, candidate chunk $\tilde{c}$ has to start before chunk c. In the third path, the candidate chunk $\tilde{c}$ includes chunk c but does not start nor end at the same position. The path is maintained on I-VP while overlapping chunk c. As a result, it will start before and end after chunk c. In addition to these $3 \times |L|$ possible paths overlapping chunk c, there is an additional path where no chunk is found over chunk c, in which case all tags stay O while overlapping chunk c. Finally, as candidate chunk c̃ must be strictly larger than chunk c, any S-tag is discarded for the duration of chunk c. Parts of the graph not overlapping with the chunk history $\mathcal{C}$ remain fully connected, as previously described above.

Figure 6:
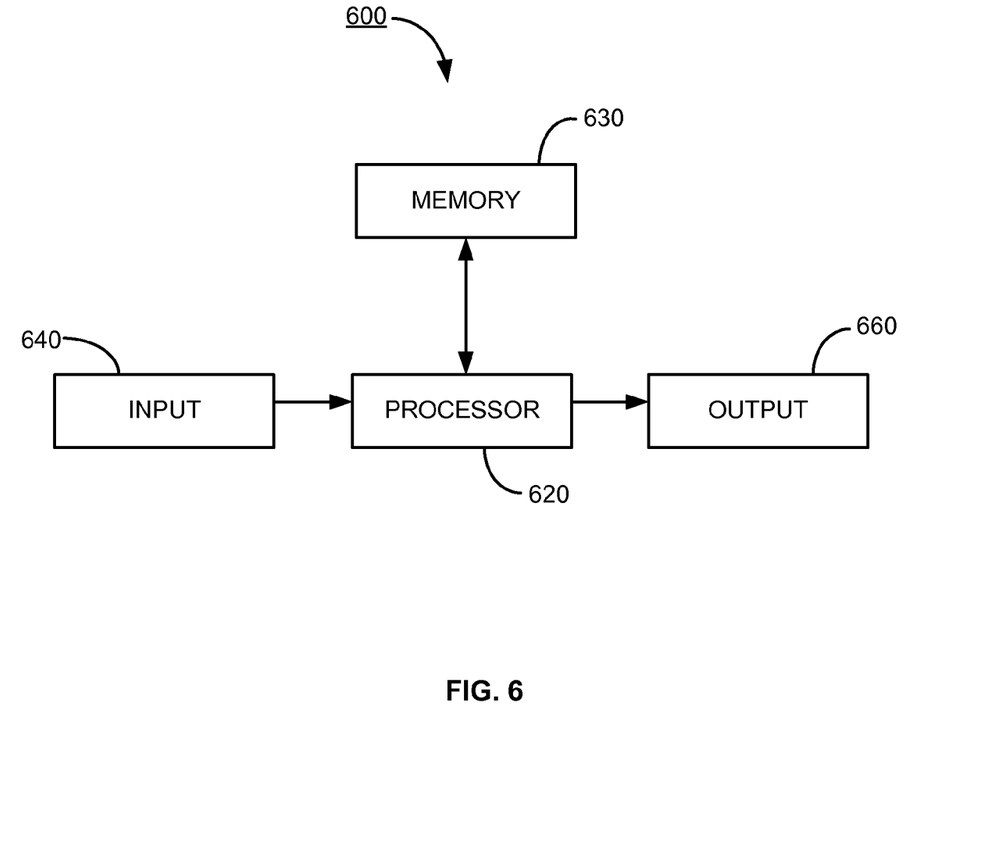
FIG. 6 is a block diagram of an exemplary embodiment of a computer system for implementing the method and tagger.

FIG. 6 is a block diagram of an exemplary embodiment of a computer system 600 for implementing the method and tagger described herein. The computer system 600 includes at least one CPU 620, at least one memory 630 for storing one or more programs which are executable by the processor(s) 620 for implementing the method and tagger described herein, one or more inputs 640 for receiving input data, e.g., caps, tree history, etc., and an output 660 for outputting data, e.g., the graph with network scores provided for nodes of the graph and additional transition scores for edges of the graph.

While exemplary drawings and specific embodiments of the present disclosure have been described and illustrated, it is to be understood that that the scope of the invention as set forth in the claims is not to be limited to the particular embodiments discussed. Thus, the embodiments shall be regarded as illustrative rather than restrictive, and it should be understood that variations may be made in those embodiments by persons skilled in the art without departing from the scope of the invention as set forth in the claims that follow and their structural and functional equivalents.

What is claimed is:

1. A method executed by a processor in communication with a memory storing a computer process tagger program that when executed by the processor generates a linguistic parse tree for a sentence, the method comprising the steps of:
   predicting by the computer process tagger a first level of chunk tags for the sentence; and
   predicting by the computer process at least a second level of chunk tags for the sentence using the first level or a previous level of chunk tags;
   from the predicted chunk tags, determining a sum of scores S in a graph G for a tag path $[t]_1^N$ for words $[w]_1^N$ as $$S([w]_1^N, [t]_1^N, \theta) = \sum_{n=1}^{N} \left( A_{t_{n-1}t_n} + s(x_n)_{t_n} \right),$$

where N is the number of words, θ represents trained parameters of a neural network of the tagger with a fixed-sized word dictionary W, trained parameter matrices M1 and M2, and transition score A, each node $G_{tn}$ is assigned a score $s(x_n)_{t_n}$ from the neural network of the tagger, and given a pair of nodes $G_{tn}$ and $G_{um}$, an edge is added with a transition score $A_{tu}$ on the graph; and
   outputting a graph with network scores provided for each $G_{tn}$ of the graph and additional transition scores for the edges of the graph.

2. The method of claim 1, wherein the predicting steps are performed by a Graph Transformer Network (GTN).

3. The method of claim 2, wherein the GTN includes a deep convolutional neural network (CNN).

4. The method of claim 3, wherein the CNN generates scores for potential chunk tags for words of the sentence.

5. The method of claim 2, wherein for each level, further comprising the step of combining chunk tag scores of each word of a sequence words of the sentence, and transition scores between chunk tags of a pair of consecutive words to evaluate the score for the chunk tags of the sequence of words.

6. The method of claim 5, wherein the combining step is performed with a Viterbi algorithm.

7. The method of claim 2, wherein each of the predicting steps comprises the steps of:
   finding vectors for different features of words of the sentence; and
   combining the vectors as a whole feature vector.

8. The method of claim 2, wherein each of the predicting steps uses long range dependency in the form of a lookup table.

9. The method of claim 1, wherein the step of predicting at least a second level of chunk tags is performed so that any chunk at a level overlapping a chunk at the at least the second level must span at least this over-lapped chunk, and be larger.

10. The method of claim 1, wherein the determining steps are performed with a deep convolutional neural network (CNN).

11. The method of claim 10, wherein the CNN generates scores for potential chunk tags for words of the sentence.

12. The method of claim 1, wherein for each level, further comprising the step of combining chunk tag scores of each word of a sequence words of the sentence, and transition scores between chunk tags of a pair of consecutive words to evaluate the score for the chunk tags of the sequence of words.

13. The method of claim 12, wherein the combining step is performed with a Viterbi algorithm.

14. The method of claim 1, wherein each of the predicting steps comprises the steps of:
   finding vectors for different features of words of the sentence; and
   combining the vectors as a whole feature vector.

15. The method of claim 1, wherein each of the predicting steps uses long range dependency in the form of a lookup table.

16. An apparatus for generating a linguistic parse tree for a sentence, the apparatus comprising:
   a processor and a memory, the memory embodying instructions that when executed by the processor cause the processor to perform the functions of:
   predicting a first level of chunk tags for the sentence; and
   predicting at least a second level of chunk tags for the sentence using the first level or a previous level of chunk tags;
   from the predicted chunk tags, determining a sum of scores S in a graph G for a tag path $[t]_1^N$ for words $[w]_1^N$ as $$S([w]_1^N, [t]_1^N, \theta) = \sum_{n=1}^{N} \left( A_{t_{n-1}t_n} + s(x_n)_{t_n} \right),$$

where N is the number of words, θ represents trained parameters of a neural network of a tagger with a fixed-sized word dictionary W, trained parameter matrices M1 and M2, and transition score A, each node $G_{tn}$ is assigned a score $s(x_n)_{t_n}$ from the neural network of the tagger, and given a pair of nodes $G_{tn}$ and $G_{um}$, an edge is added with a transition score $A_{tu}$ on the graph; and
   outputting a graph with network scores provided for each $G_{tn}$ of the graph and additional transition scores for the edges of the graph.

17. An apparatus for generating a linguistic parse tree for a sentence, the apparatus comprising: a processor and a memory, the memory embodying code that when executed by the processor causes the processor to perform the functions of:

code for predicting, via a Graph Transformer Network (GTN), a first level of chunk tags for the sentence, and code for predicting at least a second level of chunk tags for the sentence using the first level or a previous level of chunk tags;

code for determining a sum of scores S from the predicted chunk tags in a graph G for a tag path $[t]_1^N$ for words $[w]_1^N$ as $$S([w]_1^N, [t]_1^N, \theta) = \sum_{n=1}^{N} \left( A_{t_{n-1}t_n} + s(x_n)_{t_n} \right),$$

where N is the number of words, θ represents trained parameters of a neural network of a tagger with a fixed-sized word dictionary W, trained parameter matrices M1 and M2, and transition score A, each node $G_{tn}$ is assigned a score $s(x_n)_{t_n}$ from the neural network of the tagger, and given a pair of nodes $G_{tn}$ and $G_{um}$, an edge is added with a transition score $A_{tu}$ on the graph; and outputting a graph with network scores provided for each $G_{tn}$ of the graph and additional transition scores for the edges of the graph.

18. The apparatus of claim 17, wherein the GTN includes a deep convolutional neural network (CNN) for generating scores for potential chunk tags for words of the sentence.

19. The apparatus of claim 17, wherein for each level, the GTN combines chunk tag scores of each word of a sequence words of the sentence, and transition scores between chunk tags of a pair of consecutive words to evaluate the score for the chunk tags of the sequence of words.

20. The apparatus of claim 17, wherein the GTN predicts the levels of chunk tags by finding vectors for different features of words of the sentence; and combining the vectors as a whole feature vector.

21. The apparatus of claim 17, wherein GTN uses long range dependency in the form of a lookup table to predict the levels of chunk tags.

* * * * *